Patented Mar. 31, 1936

2,035,620

UNITED STATES PATENT OFFICE 2,035,620

RUBBER COMPOSITION AND METHOD OF PRESERVING RUBBER

Waldo L. Semon, Silver Lake, Ohio, assignor to The B. F. Goodrich Company, New York, N. Y., a corporation of New York No Drawing. Original application August 24, 1928, Serial No. 301,934. Divided and this application November 8, 1933, Serial No. 697,152

8 Claims. (Cl. 18—50)

This invention relates to the art of preserving rubber, either in the vulcanized or unvulcanized condition, and to rubber compositions so preserved.

It is well known that amines, and especially secondary aromatic amines, when incorporated into rubber, possess the property of retarding the deterioration which it normally undergoes when exposed to light, heat, and air. The object of this invention is to provide a new class of substances which effectively retard the deterioration of rubber, and to provide age-resisting rubber compositions.

This invention, in brief, consists in treating rubber with a substance resulting from the reaction of sulfur and a secondary amine. For example, sulfur and diphenylamine react to form phenthiazine according to the following equation:

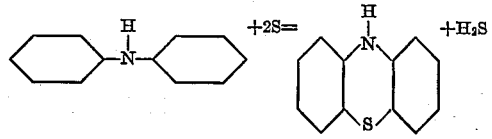

and sulfur and phenyl-beta-naphthylamine form alpha, beta naphthphenthiazine;

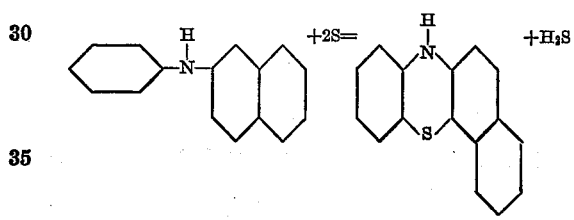

Similar reaction products may also be prepared from sulfur and other secondary amines such as symmetrical diphenyl or ditolyl ethylene diamine, symmetrical diphenyl or dinaphthyl p-phenylene diamine, etc. Such products may be incorporated into rubber or a rubber composition, with very beneficial effects on the age-resisting properties of the rubber, preferably from 0.1 to 5.0 parts by weight to 100 parts of rubber being used.

*Example 1.*—As a specific example of one embodiment of the method of this invention, alpha, beta naphthphenthiazine was prepared by mixing 220 parts by weight of phenyl-beta naphthylamine (1 molecular equivalent), 66 parts of sulfur (2 molecular equivalents), and 10 parts of aluminum chloride. The mixture was gently heated and allowed to stand over night. The reaction product was ground and washed to remove the aluminum chloride. A typical tire tread composition was prepared containing blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. One portion of this was used as a control, while 0.95 parts (0.5% of the composition) of the alpha, beta naphthphenthiazine prepared as described above was added as age-resister to another portion. The two compositions were then thoroughly mixed, and vulcanized in a press for 45 minutes at 294° F. to produce an optimum cure. The vulcanized compositions were tested to compare their relative rates of aging by measuring their tensile strength and elongation at the breaking point before and after aging. The accelerated aging was carried out by suspending different samples in the Geer aging oven, in which they were maintained at a temperature of 158° F. in a constantly renewed stream of air, and in the Bierer-Davis bomb, in which they were maintained at the same temperature in an atmosphere of oxygen at a pressure of 300 lbs. per sq. in. The results are shown in the following table:

*Tensile strength in pounds per square inch and elongation at the breaking point*

| Exposure | Without age-resister | | With age-resister | |
|---|---|---|---|---|
| | Tensile strength | Elongation | Tensile strength | Elongation |
| Before aging | 3533 | 640% | 3481 | 640% |
| After 7 days in the Geer oven | 2062 | 432% | 2766 | 553% |
| After 48 hours in the Bierer-Davis bomb | 861 | 310% | 1900 | 503% |

*Example 2.*—As another specific example of the method of this invention, beta alpha naphthphenthiazine was prepared by heating together sulfur and phenyl-alpha-naphthylamine in a manner similar to that given in Example 1. The product was incorporated into a rubber composition and tested as above with the following results:

*Tensile strength in pounds per square inch and elongation at the breaking point*

| Exposure | Without age-resister | | With age-resister | |
|---|---|---|---|---|
| | Tensile strength | Elongation | Tensile strength | Elongation |
| Before aging | 3833 | 671% | 3793 | 682% |
| After 7 days in the Geer oven | 2025 | 510% | 2743 | 537% |
| After 48 hours in the Bierer-Davis bomb | 796 | 290% | 2685 | 585% |

Example 3.—As another specific example of the method of this invention, phenthiazine was prepared by heating together sulfur and diphenylamine. The product was incorporated into a rubber composition and tested as before with the following results:

*Tensile strength in pounds per square inch and elongation at the breaking point*

| Exposure | Without age-resister | | With age-resister | |
|---|---|---|---|---|
| | Tensile strength | Elongation | Tensile strength | Elongation |
| Before aging | 3533 | 640% | 3402 | 650% |
| After 7 days in the Geer oven | 2062 | 432% | 2686 | 493% |
| After 48 hours in the Bierer-Davis bomb | 861 | 310% | 2714 | 538% |

From the examples shown above it is evident that the reaction products of sulfur and secondary amines are excellent age-resisters in rubber. Obviously other proportions of the age-resisters may be employed, or they may be incorporated in other rubber compositions differing widely from that given above, which is merely illustrative of a single application of the invention. They may also be applied to unvulcanized or vulcanized rubber with good effect on the age-resisting properties of the rubber, such as by applying them to the surface of the rubber, as for example in solution, or in the form of a paste or emulsion.

The products of this invention may also be prepared by other methods than that specifically mentioned in the examples. For example, the products of the reaction of secondary amines with sulfur chloride are probably similar to the thiazines made from molecular sulfur, although other products may accompany the thiazines to give a rather complex mixture. Or chlorinated secondary amines may be reacted with hydrogen sulfide or alkali sulfides to give substituted thiazines, or similar compounds containing sulfur and nitrogen in a cyclic nucleus.

If sulfur is reacted with the amines in a proportion greater than 2 molecular equivalents of sulfur to 1 equivalent of amine, or if sulfur chloride is reacted with amines, or if sulfur is reacted with the products prepared by another method (such as the condensation of a chlorinated secondary amine with sodium sulfide), poly-sulfides may be formed. For example, the reaction product of phenyl beta-naphthylamine with sulfur chloride is a disulfide whose structural formula may be represented either as

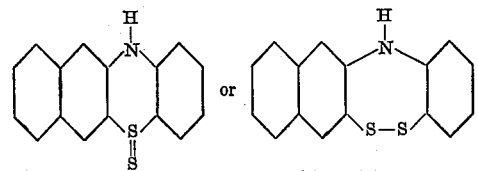

Other similar products may be prepared from other diarylamines.

It is not essential that the products of this invention possess a structural formula exactly like that hereinabove illustrated. It is known that some of the products of the general class of this invention do possess such structural formulæ, but others probably have quite different formulæ, or represent mixtures of various substances.

It is to be understood that the term "treating" as employed in the appended claims is used in a generic sense to include either the incorporation of the age-resisters into the rubber by milling or similar process, or to the application thereof to the surface of a mass of crude or vulcanized rubber. The term "rubber" is likewise employed in the claims in a generic sense to include caoutchouc, balata, gutta percha, rubber isomers and like products, whether or not admixed with fillers, pigments, vulcanizing or accelerating agents.

This is a division of my copending application Serial No. 301,934 filed August 24, 1928, now Patent 1,940,816.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with the reaction product of phenyl naphthylamine and sulfur chloride.

2. A method of preserving rubber which comprises subjecting it to vulcanization in the presence of a material having the following structural formula:

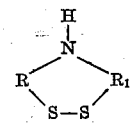

in which R is a benzene group and R₁ is a naphthylene group.

3. A method of preserving rubber which comprises subjecting it to vulcanization in the presence of dithio phenyl beta naphthylamine.

4. A rubber product that has been vulcanized in the presence of dithio phenyl beta naphthylamine.

5. A rubber product that has been vulcanized in the presence of a material having the formula:

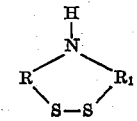

in which R is a naphthylene group and R₁ is a benzene group.

6. A rubber product that has been vulcanized in the presence of a material having the following formula:

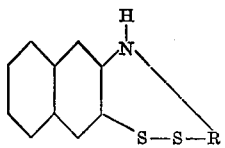

in which R is an aryl group.

7. A rubber product that has been vulcanized in the presence of a material having the following formula:

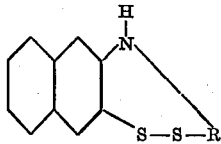

in which R is a benzene group.

8. A method of preserving rubber which comprises subjecting it to vulcanization in the presence of a reaction product of phenyl beta naphthylamine and sulfur chloride.

WALDO L. SEMON.